US010760443B2

(12) United States Patent
Strock et al.

(10) Patent No.: US 10,760,443 B2
(45) Date of Patent: *Sep. 1, 2020

(54) TURBINE ABRADABLE AIR SEAL SYSTEM

(71) Applicant: United Technologies Corporation, Farmington, CT (US)

(72) Inventors: Christopher W. Strock, Kennebunk, ME (US); Paul M. Lutjen, Kennebunkport, ME (US); Michael J. Bruskotter, Cape Neddick, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,596

(22) Filed: Apr. 9, 2018

(65) Prior Publication Data

US 2018/0298776 A1 Oct. 18, 2018

Related U.S. Application Data

(63) Continuation of application No. 15/026,755, filed as application No. PCT/US2014/056051 on Sep. 17, 2014, now Pat. No. 9,938,849.
(Continued)

(51) Int. Cl.
*F01D 11/12* (2006.01)
*C23C 4/129* (2016.01)
(Continued)

(52) U.S. Cl.
CPC ............ *F01D 11/122* (2013.01); *C23C 4/129* (2016.01); *C23C 4/134* (2016.01); *C23C 4/18* (2013.01);
(Continued)

(58) Field of Classification Search
CPC .......... F01D 11/00; F01D 11/08; F01D 11/12; F01D 11/122; F16J 15/44; F16J 15/447; F16J 15/453
See application file for complete search history.

(56) References Cited

U.S. PATENT DOCUMENTS 4,422,648 A 12/1983 Eaton et al.
4,936,745 A 6/1990 Vine et al.
(Continued)

FOREIGN PATENT DOCUMENTS

EP 1642993 A1 4/2006
EP 0992603 B1 8/2008
(Continued)

OTHER PUBLICATIONS

European Search Report for European Application No. 18179056.9 dated Dec. 5, 2018, 8 pages.
(Continued)

*Primary Examiner* — Gilbert Y Lee
(74) *Attorney, Agent, or Firm* — Cantor Colburn LLP

(57) ABSTRACT

An air seal system for a rotor blade assembly of a gas turbine engine includes a substrate. An optional ceramic interlayer may be disposed on an optional bond coat deposited on the substrate. An erosion resistant thermal barrier coating (E-TBC) layer is disposed on the ceramic interlayer (if present) or on the bond coat, or on the substrate. An abradable layer is disposed on the erosion resistant thermal barrier coating (E-TBC) layer.

13 Claims, 3 Drawing Sheets

Related U.S. Application Data

(60) Provisional application No. 61/885,774, filed on Oct. 2, 2013.

(51) Int. Cl.
| | |
|---|---|
| *C23C 4/134* | (2016.01) |
| *C23C 4/18* | (2006.01) |
| *C23C 28/00* | (2006.01) |
| *F01D 11/02* | (2006.01) |
| *F16J 15/40* | (2006.01) |

(52) U.S. Cl.
CPC .......... *C23C 28/32* (2013.01); *C23C 28/3455* (2013.01); *F01D 11/02* (2013.01); *F16J 15/40* (2013.01); *F05D 2220/32* (2013.01); *F05D 2230/312* (2013.01); *F05D 2240/11* (2013.01); *F05D 2240/55* (2013.01)

(56) References Cited

U.S. PATENT DOCUMENTS

| | | |
|---|---|---|
| 5,024,884 A | 6/1991 | Otfinoski |
| 5,064,727 A | 11/1991 | Naik et al. |
| 5,780,171 A | 7/1998 | Nissley et al. |
| 5,879,753 A | 3/1999 | Zajchowski et al. |
| 6,284,323 B1 | 9/2001 | Maloney |
| 7,662,489 B2 | 2/2010 | Litton et al. |
| 8,343,587 B2 | 1/2013 | Litton et al. |
| 8,506,243 B2 | 8/2013 | Strock et al. |
| 8,535,783 B2 | 9/2013 | Lutjen et al. |
| 8,770,926 B2 | 7/2014 | Guo et al. |
| 2001/0019781 A1 | 9/2001 | Hasz |
| 2003/0138660 A1 | 7/2003 | Darolia et al. |
| 2005/0013994 A1 | 1/2005 | Strangman |
| 2008/0138658 A1 | 6/2008 | Litton et al. |
| 2010/0098865 A1 | 4/2010 | Litton et al. |
| 2010/0284797 A1 | 11/2010 | Jarrabet et al. |
| 2011/0103940 A1 | 5/2011 | Duval et al. |
| 2011/0164963 A1 | 7/2011 | Taylor |
| 2012/0063888 A1 | 3/2012 | Strock et al. |
| 2012/0099972 A1 | 4/2012 | Guo et al. |
| 2012/0189434 A1 | 7/2012 | Strock et al. |
| 2013/0078085 A1 | 3/2013 | Strock et al. |
| 2014/0044527 A1 | 2/2014 | Parkos et al. |
| 2015/0345427 A1 | 12/2015 | Schwarz et al. |
| 2016/0122552 A1 | 5/2016 | Strock et al. |

FOREIGN PATENT DOCUMENTS

| | | |
|---|---|---|
| EP | 2444515 A2 | 4/2012 |
| EP | 3020931 A1 | 5/2016 |

OTHER PUBLICATIONS

European Search Report for European Application No. 14851155.3, dated Apr. 28, 2017, 7 pages.
International Search Report for International Application No. PCT/US2014/056051 dated Dec. 18, 2014.
Written Opinion of the International Searching Authority for International Application No. PCT/US2014/056051 dated Dec. 18, 2014.
European Search Report for European Application No. 18179056.9; Application Filing Date Jun. 21, 2018; dated Feb. 18, 2020; 5 pages.

TURBINE ABRADABLE AIR SEAL SYSTEM

CROSS REFERENCE TO RELATED APPLICATIONS

This application claims the benefit of and priority to U.S. patent application Ser. No. 15/026,755 filed Apr. 1, 2016 which is a National Stage application of PCT/US2014/056051 filed on Sep. 17, 2014 which claims the benefit of and priority to U.S. Provisional Patent Application No. 61/885,774 filed Oct. 2, 2013, all of which are incorporated herein by reference in their entirety.

BACKGROUND OF THE INVENTION

1. Field of the Invention

The present disclosure relates to blade assemblies, and more particularly to air seal systems for a rotor blade assembly of a gas turbine engine, for example.

2. Description of Related Art

Air seals are formed between various components of gas turbine engines, such as between rotating turbine blades and the inner surface of a turbine casing. In this regard, some air seals are provided as an abradable air seal that incorporates an abradable material affixed to the inner surface of the casing. The abradable material is contacted and abraded by the rotating blade tips of the turbine blades during operation.

Other air seals are provided as wear resistant seals. Wear resistant seals also employ materials affixed to the inner surface of the casing. Such materials, however, are selected for erosion resistance, oxidation resistance and/or thermal protection, for example.

Selection of materials for forming such an air seal typically involves a compromise between resistance to wear by erosion, abradability by blade tips, spallation resistance and environment durability. Exemplary materials are set forth in U.S. Pat. Nos. 4,936,745 and 5,780,171, which are incorporated by reference herein in their entireties. Additionally, each of U.S. Pat. Nos. 6,284,323; 7,662,489; 8,343,587; 8,506,243; 8,535,783; and U.S. Patent Application Publication Nos. 2008/0138658 and 2010/0098865 is incorporated by reference herein in its entirety. Notably, materials with higher abradability tend to suffer from excess erosion, while less abradable materials tend to be susceptible to spallation. Erosion, spallation, and the like can reduce a seal's effectiveness, which can have a negative impact on thrust specific fuel consumption (TSFC).

Such conventional methods and systems have generally been considered satisfactory for their intended purpose. However, there is still a need in the art for air seal systems that allow for improved lifetime thrust specific fuel consumption. There also remains a need in the art for such systems that are easy to make and use. The present disclosure provides a solution for these problems.

SUMMARY OF THE INVENTION

An air seal system for a rotor blade assembly of a gas turbine engine includes a substrate having a bond coat thereon. An erosion resistant thermal barrier coating (E-TBC) layer is disposed inboard of the bond coat. An abradable layer is disposed inboard of the erosion resistant thermal barrier coating (E-TBC) layer.

In certain embodiments, the bond coat is deposited onto the prepared substrate. The bond coat layer can be between 0.5 to 18 mils ($1.27 \times 10^{-5}$ to $4.572 \times 10^{-4}$ meters) thick. In certain embodiments, the bond coat is metallic having a thickness of $1.27 \times 10^{-4}$ to $2.286 \times 10^{-4}$ meters (5 to 9 mils). The substrate layer can be metallic. An optional ceramic interlayer can be disposed between the bond coat and the erosion resistant thermal barrier coating (E-TBC) layer. In certain embodiments, the interlayer can be deposited inboard of the bond coat at an elevated substrate temperature. The ceramic interlayer can be $2.54 \times 10^{-6}$ to $7.62 \times 10^{-5}$ meters (0.1 to 3.0 mils) thick. For example, the ceramic interlayer can be of 7 weight % yttria stabilized zirconia (7YSZ) at less than or equal to 6% porosity.

In certain embodiments, the erosion resistant thermal barrier coating (E-TBC) layer can be deposited inboard of the ceramic interlayer. The erosion resistant thermal barrier coating (E-TBC) layer can be $2.54 \times 10{-5}$ to $3.81 \times 10{-4}$ meters (1.0 to 15 mils) thick. In certain embodiments, the abradable layer can be a porous layer having a thickness of 5.0 to 50 mils ($1.27 \times 10^{-4}$ to $1.27 \times 10^{-3}$ meters). For example, 23% porous 7YSZ, 8-15% porous 20-60 wt % GdZrOx, or any other suitable material can be used for the abradable layer.

A transition layer can be formed between each of the ceramic layers, e.g., between the optional ceramic interlayer and the thermal barrier coating as well as between the erosion resistant thermal barrier coating (E-TBC) layer and the abradable layer. The transition layers can have a mixture of properties of the adjacent layers. The transition layers can each have a thickness of 0 to $2.54 \times 10^{-4}$ meters (0 to 10 mils).

A method for forming an outer air seal system for a rotor blade assembly of a gas turbine engine includes applying an erosion resistant thermal barrier coating (E-TBC) layer inboard of a substrate. The method also includes applying an abradable layer inboard of the erosion resistant thermal barrier coating (E-TBC) layer.

A bond coat can be applied onto the substrate prior to applying the E-TBC layer. A ceramic interlayer can be applied onto the bond coat, and the E-TBC layer can be applied onto the ceramic interlayer. In certain embodiments, an abradable layer is added inboard of the erosion resistant thermal barrier coating (E-TBC) layer. The step of applying can include grit blast preparation of the substrate, HVOF (high velocity oxygen fuel) spraying of a metallic bond coat on to the substrate, diffusion heat treating the bond coat and substrate at 1975° F. in a protective atmosphere, air plasma spraying a ceramic interlayer while the part is held at an elevated temperature, air plasma spraying an erosion resistant thermal barrier coating, and then air plasma spraying an abradable layer.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
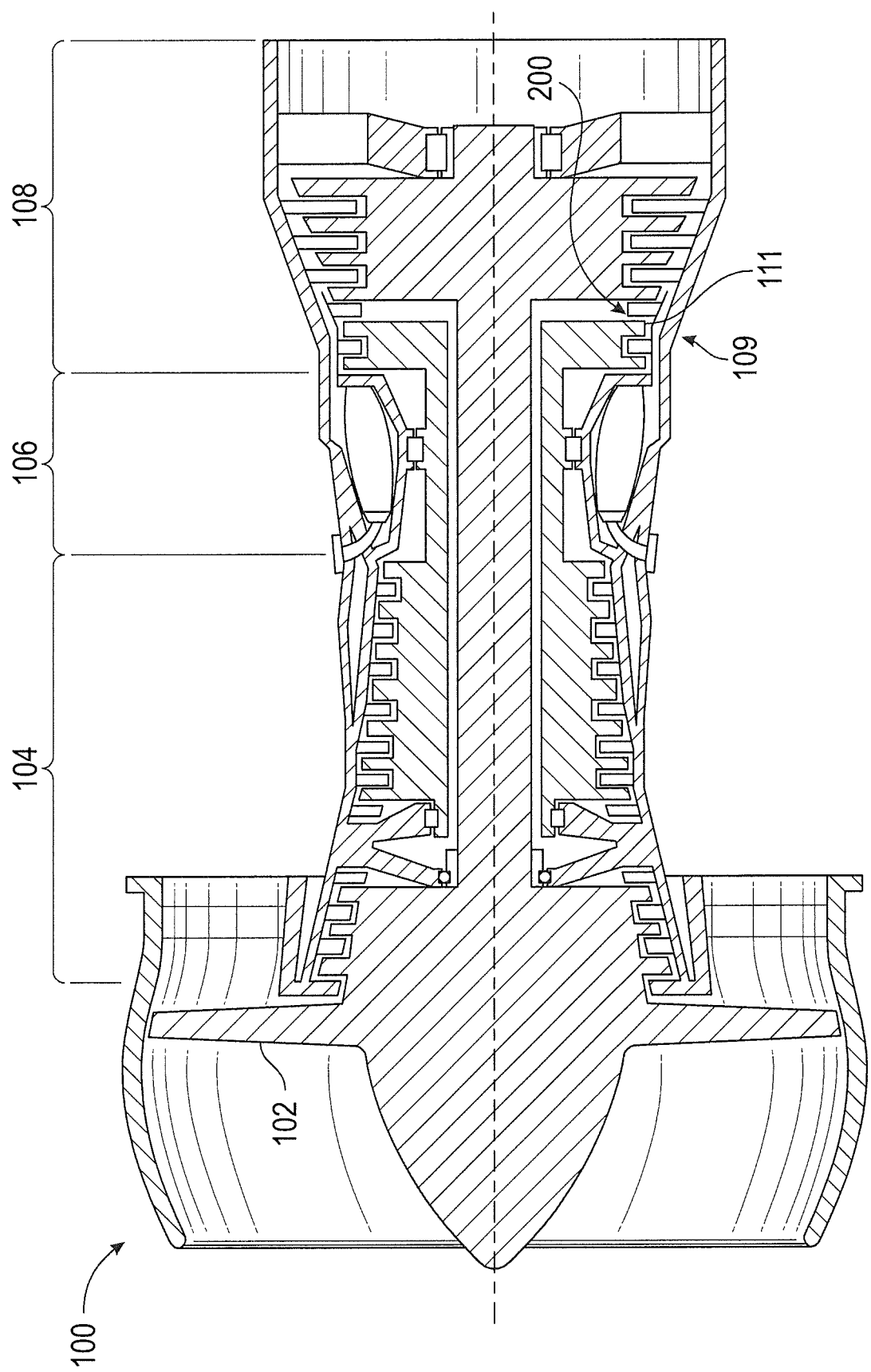
FIG. 1 is a schematic diagram depicting an exemplary embodiment of a gas turbine engine.

Reference will now be made to the drawings wherein like reference numerals identify similar structural features or aspects of the subject disclosure. For purposes of explanation and illustration, and not limitation, a partial view of an exemplary embodiment of a blade outer seal system in accordance with the disclosure is shown in FIG. 1 and is designated generally by reference character 200. Other embodiments of the air seal system in accordance with the disclosure, or aspects thereof, are provided in FIGS. 2 and 3, as will be described.

FIG. 1 is a schematic diagram depicting an exemplary embodiment of a gas turbine engine. As shown in FIG. 1, engine 100 is configured as a turbofan that incorporates a fan 102, a compressor section 104, a combustion section 106, and a turbine section 108. Notably, the turbine section is defined, at least in part by a turbine casing 109, which forms a portion of the casing of the engine. An air seal 200 (e.g., an abradable air seal) is formed between an inner surface of the turbine casing and a rotating blade (e.g., blade 111) of the turbine.

Figure 2:
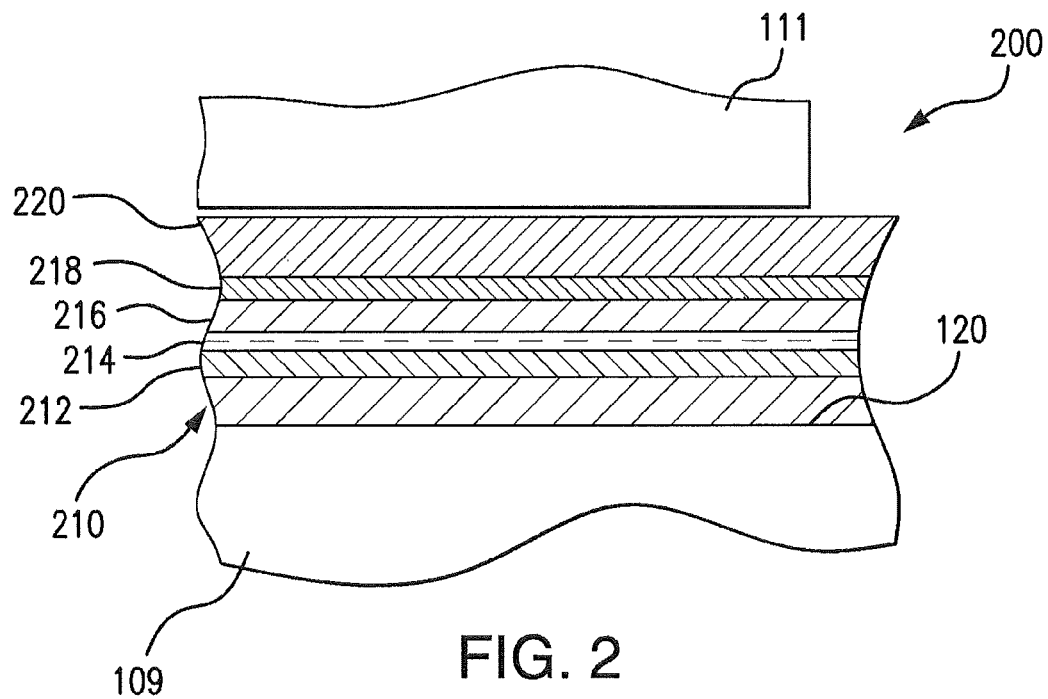
FIG. 2 is a schematic diagram depicting a portion of a representative blade tip in proximity to the casing of FIG. 1, showing detail of the air seal system formed therebetween.

As shown in FIG. 2, air seal 200 is an outer air seal located between the rotating blades 111 of the turbine (a portion of one of which is depicted in FIG. 2) and an inner surface 120 of turbine casing 109. In this embodiment, several layers of material are applied to the inner surface of the casing to form the air seal 200. These layers include a metallic substrate 210 having a bond coat 212 thereon. The bond coat 212 is metallic having a thickness of $1.27 \times 10^{-4}$ to $2.286 \times 10^{-4}$ meters (5 to 9 mils), although it is also contemplated that the bond coat thickness can be between 0.5 to 18 mils ($1.27 \times 10^{-5}$ to $4.572 \times 10^{-4}$ meters) thick.

A ceramic interlayer 214 is disposed inboard of the bond coat 212. The ceramic interlayer 214 is deposited onto the inboard surface of the bond coat 212 at an elevated substrate temperature and is $2.54 \times 10^{-6}$ to $2.54 \times 10^{-5}$ meters (0.1 to 1.0 mils) thick, but it is also contemplated that the interlayer 214 can be between $2.54 \times 10^{-6}$ to $7.62 \times 10^{-5}$ meters (0.1 to 3.0 mils) thick. The interlayer 214 provides a tough interface with the bond coat 212 within which stresses are dissipated and a reduced stress interface with the erosion resistant thermal barrier coating E-TBC layer 216 (described below) results, thus improving spallation resistance. Interlayer 214 can be of 7YSZ at less than or equal to 6% porosity, for example, or of any other suitable material.

An erosion resistant thermal barrier coating (E-TBC) layer 216 is applied onto the inboard surface of the ceramic interlayer 214. The erosion resistant thermal barrier coating (E-TBC) layer 216 provides erosion and spallation resistance and may be deposited at a high power with low relative spray torch to part surface speed. The erosion resistant thermal barrier coating (E-TBC) layer 216 can be 3.0 to 15 mils ($7.62 \times 10^{-5}$ to $3.81 \times 10^{-4}$ meters) thick. It is also contemplated that the thickness can be as low as 1.0 mils ($2.54 \times 10^{-5}$ meters) and as high as 18 mils ($4.572 \times 10^{-4}$ meters), or any other suitable thickness.

An abradable layer 220 is disposed onto the inboard surface of the erosion resistant thermal barrier coating (E-TBC) layer 216. The abradable layer 220 is a porous thermal barrier coating having a balance between erosion resistance and the ability to be cut by abrasive blade tips. For example, 23% porous 7YSZ or 8-15% porous 20-60 wt % GdZrOx can be used for the abradable layer 220. It is also contemplated that any other suitable ceramic abradable material can be used, for example ceramics filled with a softer phase such as hexagonal boron nitride (hBN). The abradable layer 220 can be 5.0 to 50 mils ($1.27 \times 10^{-4}$ to $1.27 \times 10^{-3}$ meters) thick.

A transition layer 218 is formed between the erosion resistant thermal barrier coating (E-TBC) layer 216 and the abradable layer 220. The transition layer 218 has a mixture of properties of the erosion resistant thermal barrier coating (E-TBC) layer 216 and the abradable layer 220. The transition layer 218 has a thickness between 0 to $2.54 \times 10^{-4}$ meters (0 to 10 mils). It should be noted that transition layers can be formed between any of the layers, and that the transition layers do not necessarily add to the overall thickness, but may be considered to be part of the inner most adjacent layer with an engine frame of reference, for example. The transition layers can each be a 5 mil transition from the inner adjacent layer to the next adjacent layer. It is contemplated that the transition layers can be between 0 to $2.54 \times 10^{-4}$ meters (0 to 10 mils) thick. For example, one transition layer can be a 5 mil transition from the interlayer to the erosion resistant thermal barrier coating (TBC) layer 216. So, for example, in an application with a 1 mil interlayer and 15 mil erosion resistant thermal barrier coating (E-TBC) layer could be considered to be 1 mil interlayer, 5 mil transition, and a 10 mil erosion resistant thermal barrier coating (E-TBC).

Figure 3:
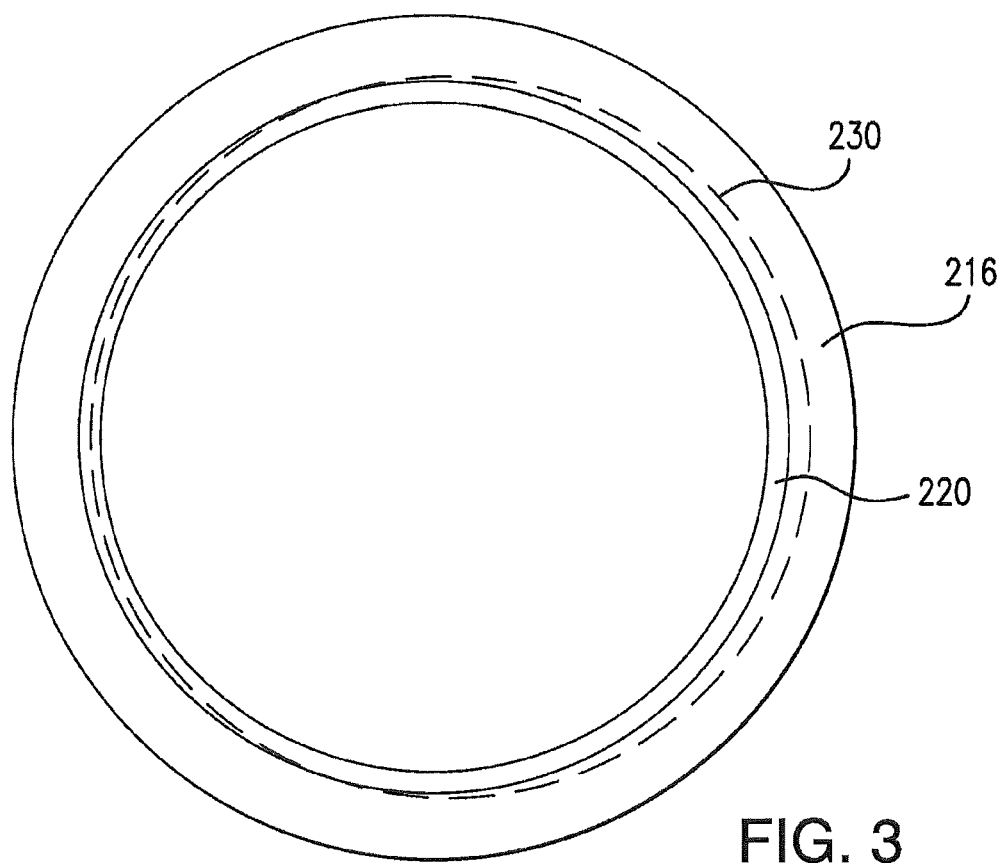
FIG. 3 is a schematic diagram illustrating exemplary portions of the air seal system of FIG. 2, showing the layers which abrade when the turbine engine is in use.

Referring to FIG. 3, the erosion resistant thermal barrier coating (E-TBC) layer 218 and the abradable layer 220 are shown depicting an exemplary rub path 230 created by the rotating blades 111 of the turbine engine. As shown, the abradable layer 220 is allowed to be removed by the rotating blades. The erosion resistant thermal barrier coating (E-TBC) layer 216 contributes very little to the volume of material that the abrasive tips need to cut because the arc length of the blade path intersecting with the E-TBC layer is relatively short given the shallow depth of cut into this layer.

Figure 4:
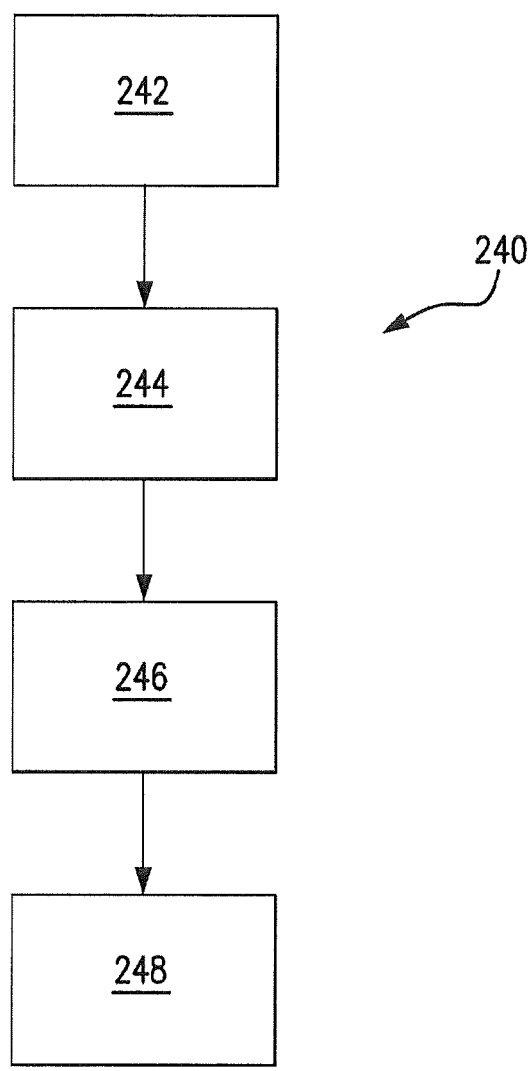
FIG. 4 is a flow chart illustrating an exemplary embodiment of a method for forming the air seal system of FIG. 3.

An embodiment of a method 240 for forming an air seal system is shown in the flow chart of FIG. 4. An exemplary preparation of the substrate, e.g., substrate 210, can include grit blasting the substrate. The substrate can be flat as depicted in FIG. 2, or can include geometric surface features as described for example in U.S. Pat. No. 8,506,243, which is incorporated by reference herein in its entirety. The bond coat, e.g., bond coat 212, is an oxidation resistant alloy which may be applied (at block 242) to the substrate by any of a number of processes. The bond coat alloy is known generically as MCrAlY and may be supplied in powder form. The powder may be deposited by any of a number of processes, however one that produces a dense (e.g. less than 5% porosity), low oxide (e.g., less than 2% oxygen) coating is suitable, for example. It is also contemplated that cathodic-arc or cat-arc that can also be used, e.g., using an MCrAlY ingot and can produce lower oxide and better oxidation resistance. A process that operates with particle velocity greater than 1000 ft/s (304.8 m/s) is suitable, such as in high velocity plasma spray, high velocity oxygen fuel, high velocity air fuel, cold spray and warm spray processes, for example. The bond coat thickness may be 8 to 12 mils ($2.032 \times 10^{-4}$ to $3.048 \times 10^{-4}$ meters). The coating and part, e.g. bond coat 212 and substrate 210, may then be diffusion heat treated to further improve bonding and oxidation resistance. For example, PWA 1386 powder, available from Sulzer Metco (all Sulzer Metco products described herein are available from Sulzer Metco (US) Inc. of Westbury, N.Y.), is deposited by high velocity oxygen fuel (HVOF) spraying and is then diffusion heat treated at 1975° F. (1079° C.) for 1 hour, e.g., in a protective atmosphere.

In a suitable setup for deposition of the above described ceramic layers, a plurality of bond coated substrates are loaded into a hollow cylindrical fixture such that the bond coated surfaces face the inner diameter of the cylindrical fixture. An auxiliary heat source, such as gas burners, is positioned around the fixture and a means for monitoring and controlling the part temperature is employed. This may include a thermocouple and temperature controller for regulating gas flow to the gas burners. A plasma spray torch is positioned in the interior of the cylindrical fixture for depositing the layers. In another exemplary setup, the parts are insulated and the plasma torch provides the heat. Variable air blower pressure may be employed to limit and control part temperature in this configuration.

The parts can then be preheated to the desired process temperature and then the ceramic interlayer, e.g., ceramic interlayer 214, is applied at block 244. After a preheat time of approximately 10 minutes and the parts are at the temperature set point, which is in one example 1200° F. (648.9° C.), the coating process is begun. Air plasma spraying can be used while the part is held at the elevated temperature. As an example, a Sulzer Metco 9 MB torch is operated at 60 kilowatts with 100 scfh (standard cubic feet per hour) (2.83 standard cubic meters per hour) of nitrogen and 25 scfh (0.708 standard cubic meters per hour) of hydrogen gas flow. A suitable powder is a yttria partially stabilized zirconia (yttria partially stabilized zirconia herein refers to a composition of about 12 weight percent or less yttria stabilized zirconia). However, a composition of between about 6 weight percent and about 20 weight percent yttria stabilized zirconia may be used. In certain applications, a suitable range between about 7 weight percent and about 12 weight percent yttria stabilized zirconia may be chosen based on material strength. Similarly, other zirconia based compositions can be used, such as ceria stabilized zirconia, magnesia stabilized zirconia, calcia stabilized zirconia, and mixtures thereof may be substituted for the yttria stabilized zirconia. An example of a suitable powder is Sulzer Metco 204B NS of $ZrO_2$ $8Y_2O_3$ composition. This can be fed through a #2 powder port at 20 g/minute with 12 scfh (0.340 cubic meters per hour) of nitrogen carrier gas. The parts are arranged on a 30 inch (76.2 cm) diameter fixture which is rotated at 10 rpm, for example, which can be adapted for other sizes of fixtures. The torch can be traversed back and forth in front of the parts at a 2.75 inch (6.99 cm) stand-off distance and 3 inches (7.62 cm) per minute traverse speed.

The erosion resistant thermal barrier coating (E-TBC) layer, e.g., erosion resistant thermal barrier coating (E-TBC) layer 216, is applied onto the ceramic interlayer, e.g., interlayer 214, at block 246. Again, air plasma spraying can be used. The process may begin while the parts are still at elevated temperature or may be conducted as a separate spray event after the parts have cooled. The powder may be the same as that used for the ceramic interlayer or may be switched to one of different particle morphology or composition. Suitable compositions include those suitable for the ceramic interlay with the additional option of gadolinia stabilized zirconia and other low conductivity ceramic materials. Suitable powers for the erosion resistant thermal barrier coating (E-TBC) layer include compositions disclosed in European Patent No. EP0992603, which is incorporated by reference herein in its entirety. In an exemplary process, Sulzer Metco 204B NS powder continues spraying onto the parts as described above without interruption, while the process parameters are gradually changed to those for the erosion resistant thermal barrier coating (E-TBC) layer. This produces a graded zone, or transition layer, which in this example is 3 to 5 mils ($7.62 \times 10^{-5}$ to $1.27 \times 10^{-4}$ meters) thick. Including the graded zone, the erosion resistant thermal barrier coating (E-TBC) layer is 12 to 18 mils ($3.048 \times 10^{-4}$ to $4.572 \times 10^{-4}$ meters) thick. While depositing the graded zone, the exemplary process increases rpm to 80, stand-off to 4 inches (0.1016 meters), traverse rate to 12 inches (0.3048 meters) per minute, powder feed rate to 50 g/min (grams per minute) and reduces torch power to 35 kW with hydrogen flow rate reduced to 18 scfh (0.510 cubic meters per hour) and carrier gas flow rate to 10 scfh (0.283 cubic meters per hour). Auxiliary heating is also stopped, allowing the part temperature to passively drop as the process progresses. This process can be continued at these conditions until the target thickness is achieved for the erosion resistant thermal barrier coating (E-TBC) layer.

The abradable top layer, e.g., abradable layer 220, is then applied onto the erosion resistant thermal barrier coating (E-TBC) layer, e.g., using air plasma spraying, at block 248. This may begin while the parts are still at elevated temperature following the erosion resistant thermal barrier coating (E-TBC) layer application or may be conducted as a separate spray event after the parts have cooled. The powder may be the same as that used for the erosion resistant thermal barrier coating (E-TBC) layer, or may be switched to one of different particle morphology or composition. In an exemplary process, parameters are gradually adjusted while the first 5 mils ($1.27 \times 10^{-4}$ meters) of abradable layer is being applied. 40 Wt % gadolinia stabilized zirconia powder is used at a rate of 40 g/minute and injected into the plasma stream with a carrier gas flow rate of 11 scfh (0.311 cubic meters per hour). Torch stand-off distance is increased to 5 inches (12.7 cm) and traverse rate to 20 inches (50.8 cm) per minute. Fixture speed is increased to 100 rpm. Coating application is continued until the final desired coating thickness is reached. In this example that is 40 mils ($1.016 \times 10^{-3}$ meters) of abradable top layer, which includes 5 mils ($1.27 \times 10^{-4}$ meters) of graded transition much as described above. While an exemplary composition for the abradable top layer has been described above, any other suitable composition can be used, for example, the composition can be 8 Wt % yttria stabilized zirconia blended with approximately 6 Wt % of methylmethacrylate particles (SM2602 from Sulzer Metco).

While described above in the exemplary context of including a bond coat on the substrate, it is possible to use the ceramic layers on a special base metal that does not require a bond coat. However it is to be expected that in typical high temperature applications the bond coat will be required.

While certain layers are referred to herein as being thermally insulative, e.g., thermal barrier coatings, and others are referred to herein as being abradable, it is to be understood that all the ceramic layers can be considered to be insulating, and all may be considered to be abradable. Moreover, the erosion resistant aspect, e.g., of the erosion resistant thermal barrier coating (E-TBC), is indicative of the presence of a layer that has lower erosion resistance such as the abradable layer, since all the ceramic layers can be considered to have some erosion resistance. For example, abradable layer 220 may be erosion resistant like erosion resistant thermal barrier coating (E-TBC) layer, or may be an abradable or low conductivity layer having higher porosity, less strong bonding between spray particles, and/or a composition containing a higher concentration of stabilizing elements such as Y and Gd. So, for example, a coating system in accordance with this disclosure can include a ceramic coating with arbitrary top layer(s) and a toughened interlayer to help prevent spallation. In another aspect, a coating system in accordance with this disclosure can include an abradable coating with a toughened interlayer to help prevent spallation and an optional erosion resistant middle layer.

While described in the exemplary context of turbine abradable layers, it is also contemplated that systems as disclosed herein can be used as a thermal barrier coating (TBC). i.e. in applications without rub. In such applications, the erosion resistant thermal barrier coating (E-TBC) layer provides some minimum required durable thermal barrier function, while the inboard layer, e.g., the abradable layer, provides additional thermal insulation in a less durable form.

The methods and systems of the present disclosure, as described above and shown in the drawings, provide for an air seal system with superior properties, and may include an optional toughened ceramic interlayer with the erosion resistant thermal barrier layer for improved lifetime thrust specific fuel consumption. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A seal system for a rotor blade assembly of a gas turbine engine, the seal system comprising:
    a substrate;
    a bond coat disposed on the substrate;
    an erosion resistant thermal barrier coating (E-TBC) layer inboard of the ceramic layer; and
    an abradable layer consisting of porous yttria stabilized zirconia (YSZ) or a ceramic filled with hexagonal boron nitride and disposed inboard of the erosion resistant thermal barrier coating (E-TBC) layer wherein a transition layer is formed between the erosion resistant thermal barrier coating (E-TBC) layer and the abradable layer, the transition layer having a mixture of properties of the erosion resistant thermal barrier coating (E-TBC) layer and the abradable layer.

2. A seal system as recited in claim 1, wherein the bond coat is metallic having a thickness of $1.27 \times 10^{-4}$ to $2.286 \times 10^{-4}$ meters (5 to 9 mils).

3. A seal system as recited in claim 1, further comprising a ceramic interlayer inboard of the bond coat.

4. A seal system as recited in claim 3, wherein the ceramic interlayer is $2.54 \times 10^{-6}$ to $7.62 \times 10^{-5}$ meters (0.1 to 3.0 mils) thick.

5. A seal system as recited in claim 1, wherein the abradable layer is a porous, erosion resistant layer having a thickness of 5 to 50 mils ($1.27 \times 10^{-4}$ to $1.27 \times 10^{-3}$ meters).

6. A seal system as recited in claim 1, wherein the substrate layer is metallic.

7. A method for forming an air seal system for a rotor blade assembly of a gas turbine engine comprising:
    applying a bond coat onto a substrate;
    applying an erosion resistant thermal barrier coating (E-TBC) layer onto the interlayer;
    applying a transition layer inboard of the erosion resistant thermal barrier coating layer (E-TBC); and
    applying an abradable layer consisting of porous yttria stabilized zirconia (YSZ) or a ceramic filled with hexagonal boron nitride inboard of the transition layer and the erosion resistant thermal barrier coating (E-TBC) layer.

8. A method as recited in claim 7, wherein applying the bond coat includes high velocity oxygen fuel (HVOF) spraying a metallic bond coat material onto the substrate.

9. A method as recited in claim 8, wherein applying the bond coat includes diffusion heat treating the bond coat and substrate at 1975° F. (1079° C.) in a protective atmosphere.

10. A method as recited in claim 7, further comprising applying a ceramic interlayer onto the bond coat, wherein applying the erosion resistant thermal barrier coating (E-TBC) layer includes applying the erosion resistant thermal barrier coating (E-TBC) layer onto the interlayer.

11. A method as recited in claim 8, wherein applying the abradable layer includes air plasma spraying abradable layer material onto the erosion resistant thermal barrier coating (E-TBC) layer.

12. A method as recited in claim 10, wherein applying the ceramic interlayer includes air plasma spraying a ceramic interlayer material onto the bond coat while the substrate and bond coat are held at an elevated temperature.

13. A method as recited in claim 12, wherein applying the erosion resistant thermal barrier coating (E-TBC) layer includes air plasma spraying erosion resistant thermal barrier coating (E-TBC) layer material onto the ceramic interlayer.

* * * * *